US012766572B2

(12) United States Patent
Pantzar

(10) Patent No.: US 12,766,572 B2
(45) Date of Patent: Oct. 20, 2026

(54) CLEANING IN PLACE UNIT, A CLEANING IN PLACE SYSTEM AND A METHOD THEREOF

(71) Applicant: Tetra Laval Holdings & Finance S.A., Pully (CH)

(72) Inventor: Göran Pantzar, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 94 days.

(21) Appl. No.: 18/853,156

(22) PCT Filed: Mar. 16, 2023

(86) PCT No.: PCT/EP2023/056822
§ 371 (c)(1),
(2) Date: Oct. 1, 2024

(87) PCT Pub. No.: WO2023/194070
PCT Pub. Date: Oct. 12, 2023

(65) Prior Publication Data

US 2025/0214122 A1 Jul. 3, 2025

(30) Foreign Application Priority Data

Apr. 7, 2022 (EP) .................................... 22167159

(51) Int. Cl.

| | |
|---|---|
| ***B08B 9/032*** | (2006.01) |
| ***A01J 7/02*** | (2006.01) |
| ***B08B 3/10*** | (2006.01) |

(52) U.S. Cl.
CPC ............. *B08B 9/0325* (2013.01); *A01J 7/022* (2013.01); *B08B 3/106* (2013.01); *B08B 2203/007* (2013.01); *B08B 2209/032* (2013.01)

(58) Field of Classification Search
CPC . B08B 9/0325; B08B 3/106; B08B 2203/007; B08B 2209/032; B08B 3/108; B08B 9/0321; A01J 7/022
See application file for complete search history.

(56) References Cited

U.S. PATENT DOCUMENTS 2,239,397 A * 4/1941 North .................... A23B 70/30 426/522
2009/0148556 A1 6/2009 Stippler et al.
(Continued)

FOREIGN PATENT DOCUMENTS

CN 101146906 A 3/2008
CN 103975051 A 8/2014
(Continued)

OTHER PUBLICATIONS

Machine translation of KR-20110060392-A (Year: 2011).*
International Search Report mailed Jun. 26, 2023, for International Application No. PCT/EP2023/056822.

*Primary Examiner* — Erin F Bergner
(74) *Attorney, Agent, or Firm* — Renner, Otto, Boisselle & Sklar

(57) ABSTRACT

A cleaning in place, CIP, unit is provided for cleaning a liquid food processing plant by means of a cleaning liquid. The CIP unit comprising: one or more control valves configured to control a liquid flow of the cleaning liquid in the CIP unit; a flow rate arrangement; a balance tank; and a heat exchanger; forming a main circuit with the liquid food processing plant. The CIP unit further comprises a high pressure circuit section configured to bypass the balance tank, the high pressure circuit section comprising: a further control valve; and a pressure arrangement configured to increase the pressure of the cleaning liquid above an atmospheric pressure, wherein the high pressure circuit section is connected to the main circuit thereby forming a high pres-
(Continued)

sure circuit with the main circuit while the high pressure circuit section bypasses the balance tank. A system for cleaning the liquid food processing plant is also provided. A method for cleaning the liquid food processing plant is also provided.

15 Claims, 3 Drawing Sheets

(56) References Cited

U.S. PATENT DOCUMENTS

| | | | | |
|---|---|---|---|---|
| 2015/0298179 | A1 | 10/2015 | Suematsu et al. | |
| 2020/0339401 | A1 * | 10/2020 | Hayakawa | A61L 2/18 |

FOREIGN PATENT DOCUMENTS

| | | | | | |
|---|---|---|---|---|---|
| EP | 1240106 | A1 | | 9/2002 | |
| EP | 3741721 | A1 | | 11/2020 | |
| JP | 2007236706 | A | | 9/2007 | |
| KR | 20110060392 | A | * | 6/2011 | B08B 3/08 |
| WO | 0140115 | A1 | | 6/2001 | |
| WO | 0206436 | A1 | | 1/2002 | |
| WO | 2020216275 | A1 | | 10/2020 | |

* cited by examiner

CLEANING IN PLACE UNIT, A CLEANING IN PLACE SYSTEM AND A METHOD THEREOF

TECHNICAL FIELD

The invention generally relates to a cleaning in place, CIP, unit. More particularly, it is related to a CIP unit for cleaning a liquid food processing plant by means of a cleaning liquid. The invention also relates to a CIP system comprising the CIP unit and the liquid food processing plant. The invention also relates to a method for cleaning a liquid food processing plant.

BACKGROUND ART

Within all food production, not least in the dairy industry, a meticulous cleaning of all production equipment is an imperative requirement for good production. Careless hygiene may involve serious consequences since food, especially dairy products, is a perfect nutrient bed where bacteria rapidly multiply. Today, cleaning in place, CIP, units for cleaning the equipment by means of a cleaning liquid, e.g. rinsing and cleaning solutions, are well-known in the art. The CIP unit is configured to provide an automated cleaning of the equipment without major disassembly of the equipment. CIP may be defined as circulating the cleaning liquid through the equipment and plant parts which are connected to the CIP unit. When the cleaning liquid passes past the surfaces which are to be cleaned, chemical and mechanical working of the residues on the surfaces takes place which is a necessity for good cleaning effect. Different equipment and plant parts with different contaminations and objects demand varying cleaning programs in order to obtain a satisfactory cleaning result. CIP units are typically used in dairy industry as well as in soft drink production.

Even though CIP units have been used for cleaning equipment and plant parts by customers for decades, there is room for improvement. For instance, a challenge with today's CIP units is that for some equipment or plant parts having great contamination are difficult to obtain a satisfactory cleaning result. If this is the case, the amount of cleaning liquid or time needed to clean the equipment or plant parts may be increased in order to obtain the satisfactory cleaning result.

For these reasons, there is a demand for a CIP unit that is capable of cleaning a cleaning object in an efficient way but also in an environmentally friendly way.

SUMMARY

It is an object of the disclosure to provide an efficient cleaning in place unit being configured to clean a liquid food processing plant.

Another object is to provide an environmentally friendly cleaning in place unit being configured to clean a liquid food processing plant.

Another object is to provide a time-efficient cleaning in place unit being configured to clean a liquid food processing plant.

Another object is to provide a cost-efficient cleaning in place unit being configured to clean the liquid food processing plant.

According to a first aspect it is provided a cleaning in place, CIP, unit for cleaning a liquid food processing plant by means of a cleaning liquid, the CIP unit comprising: a flow rate arrangement configured to control a flow rate of the cleaning liquid; a balance tank configured to balance a volume of the cleaning liquid at an atmospheric pressure; and a heat exchanger configured to transfer heat to and/or from the cleaning liquid; wherein the one or more control valves, the flow rate arrangement, the balance tank and the heat exchanger are connected in series thereby forming a main circuit section, the main circuit section being configured to be connected to the liquid food processing plant thereby forming a main circuit with the liquid food processing plant, wherein the CIP unit further comprises a high pressure circuit section configured to bypass the balance tank, the high pressure circuit section comprising: a further control valve configured to control the liquid flow of the cleaning liquid to bypass the balance tank, and a pressure arrangement configured to control a pressure of the cleaning liquid, wherein the pressure arrangement is configured to increase the pressure of the cleaning liquid above atmospheric pressure, when the cleaning liquid is bypassing the balance tank, wherein the high pressure circuit section is connected to the main circuit thereby forming a high pressure circuit with the main circuit while the high pressure circuit section bypasses the balance tank.

The CIP unit is configured to clean the liquid food processing plant, preferably pipes of the liquid food processing plant. In other words, the CIP unit is configured to provide a cleaning process for the liquid food processing plant in order to clean the liquid food processing plant. The food processing plant may be a processing equipment. The food processing plant may be one or more plant parts comprised in a processing equipment. Thus, in this context, the term "food processing plant" should be interpreted as being a complete processing plant, a processing equipment, plant parts comprised in the processing equipment or equipment parts thereof. The liquid food processing plant is typically a closed equipment. The liquid food processing plant may be any processing plant or processing equipment which includes a closed equipment, circuit or loop. The CIP unit is configured to clean the food processing plant by circulating the cleaning liquid one or more times through the liquid food processing plant in order to obtain a satisfactory cleaning result. The cleaning liquid typically comprises rinsing and cleaning solutions, e.g. water and/or one or more cleaning agents. The one or more cleaning agent may be lye or acid. Other cleaning agents suitable for cleaning the liquid food processing plant may be used as well.

In this context, the flow rate arrangement may be arranged with any components configured to control the flow rate of the cleaning liquid while circulating the cleaning liquid. The pressure arrangement may be arranged with any components configured to control the pressure of the cleaning liquid while circulating the cleaning liquid.

The balance tank is configured to provide fresh water to the cleaning liquid if needed. For that reason, the balance tank is typically connected to a fresh water inlet. The balance tank is connected or open to the ambient such that the liquid, e.g. water and/or cleaning liquid, being present in the balance tank is kept at the atmospheric pressure. The balance tank is open to the ambient either directly or indirectly. The balance tank may have level sensors configured to indicate the volume of the liquid present in the balance tank. Since the pressure and/or temperature of the cleaning liquid may vary while being circulated in the CIP unit, the volume of the liquid present in the balance tank may be expanded or decreased in volume throughout the cleaning process. Therefore, the balance tank should typically not be filled with a maximum volume, or a minimum volume, of liquid thereby there is room for the liquid to expand or decrease in volume but still having a desired volume of liquid in the balance tank.

The flow rate arrangement, the balance tank, and the heat exchanger may be arranged in any order suitable for the cleaning process in order to obtain the satisfactory cleaning result. The flow rate arrangement, the balance tank, and the heat exchanger are preferably connected via pipes such that the cleaning liquid is able to be circulated or fed in the CIP unit between the different components comprised in the CIP unit.

The high pressure circuit is a closed loop circuit. The closed loop circuit is formed by that the further control valve bypassing the balance tank and by that the liquid food processing plant being the closed equipment, i.e. an equipment including a closed circuit or loop to which the CIP unit is connected during cleaning. An advantage with the high pressure circuit is that the pressure arrangement being configured to increase the pressure of the cleaning liquid above the atmospheric pressure. When having the high pressure circuit, in which the pressure is above the atmospheric pressure, a boiling point of the cleaning liquid is increased above a boiling point of the cleaning liquid at the atmospheric pressure. By increasing the boiling point of the cleaning liquid, it is possible to increase the temperature of the cleaning liquid above the boiling point of the cleaning liquid at the atmospheric pressure, wherein a risk that the cleaning liquid will start to boil is reduced. This is advantageous in that it allows the CIP unit to use a cleaning liquid having a higher temperature compared to the temperatures used in conventional CIP units. In this context, the higher temperature should be interpreted as being a temperature above the boiling point at the atmospheric pressure. Put differently, the cleaning liquid having the higher temperature is stable because of overpressure that raises the boiling point. By being able to clean the liquid food processing plant with the cleaning liquid having the higher temperature, an efficient CIP unit is provided. This also provides for an efficient cleaning process, since cleaning liquid having higher temperature is more efficient than cleaning liquids having lower temperatures, being below the boiling point at the atmospheric pressure.

The CIP unit is further advantageous in that, by being able to use the cleaning liquid having the higher temperature, the time needed for cleaning the liquid food processing plant is reduced. Thus, a downtime of the liquid food processing plant is decreased.

The CIP unit is yet further advantageous in that, by being able to use the cleaning liquid having the higher temperature, the amount of water and/or cleaning agent needed in order to get the liquid food processing plant cleaned is reduced. Thus, a more environmentally friendly CIP unit is achieved.

Thus, the disclosed CIP unit provides for that an efficient and also environmentally friendly cleaning process is achieved.

The pressure arrangement configured to control the pressure of the cleaning liquid may comprise a pressure pump and a pressure detector, for example a pressure transmitter and/or a pressure sensor known, wherein the pressure detector may be configured to control an operation of the pressure pump.

This is advantageous in that the pressure detector is configured to control the operation of the pressure pump such that the pressure of the cleaning liquid is increased above the atmospheric pressure when the high pressure circuit is formed. This also facilitates the provision of decreasing the pressure of the cleaning liquid below the atmospheric pressure when needed. By having the pressure detector, like a transmitter, it is possible to control the operation of the pressure pump in an efficient way.

The CIP unit may further comprise a heating medium inlet which may be configured to provide a heating medium of the heat exchanger, such as steam or any other known in the prior art, wherein the heat exchanger may be configured to increase the temperature of the cleaning liquid above a boiling point of the cleaning liquid at the atmospheric pressure, when the cleaning liquid is fed in the high pressure circuit.

The heating medium is used when the heat exchanger is configured to transfer heat to the cleaning liquid. In this context, the heating medium inlet may be controlled by a heating medium valve being configured to control the amount of heating medium fed to the heat exchanger. In this context, the term "fed in the high pressure circuit" should be interpreted as the cleaning liquid is circulated in the high pressure circuit. The cleaning liquid may be circulated one or more times in the high pressure circuit in order to obtain the satisfactory cleaning result.

The heating medium provided to the heat exchanger may have a temperature of 130-170° C., preferably 140-160° C., more preferably 150° C.

This is advantageous in that it allows the heat exchanger to increase the temperature of the cleaning liquid above the boiling point of the cleaning liquid at the atmospheric pressure. Typically, the boiling point of the cleaning liquid at the atmospheric pressure is about 100° C.

The cleaning liquid may have a cleaning temperature of 120-160° C., preferably 130-150° C., more preferably 135-145° C., when the cleaning liquid is fed in the high pressure circuit.

The CIP unit may further comprise a cooling medium inlet configured to provide a cooling medium, like water or any other known in the prior art, of the heat exchanger, wherein the heat exchanger may be configured to decrease the temperature of the cleaning liquid below the boiling point of the cleaning liquid at the atmospheric pressure.

The cooling medium is used when the heat exchanger is configured to transfer heat from the cleaning liquid. In this context, the cooling medium inlet may be controlled by a cooling medium valve being configured to control the amount of cooling medium being fed to the heat exchanger. This is advantageous in that it allows for that the heat exchanger to decrease the temperature of the cleaning liquid below the boiling point of the cleaning liquid at the atmospheric pressure. This is particularly advantageous after cleaning of the liquid food processing plant has been conducted and prior to start feeding the cleaning liquid via the balance tank thereby disconnecting the high pressure circuit section from the main circuit. When the balance tank is a part of the circuit, the CIP unit is an open unit, i.e. a unit open to the ambient, in which the boiling point of the cleaning liquid corresponds to the boiling point of the cleaning liquid at the atmospheric pressure. Thus, if the temperature of the cleaning liquid is not decreased below the boiling point at the atmospheric pressure before feeding the cleaning liquid in the main circuit, including the balance tank, there is an imminent risk that the cleaning liquid will start to boil in an uncontrolled manner when being circulated in the main circuit. Such uncontrolled boiling may present a risk for personnel injuries and equipment damage.

The cooling medium provided to the heat exchanger may have a temperature of 70-100° C., preferably 80-100° C., more preferably 95° C.

This is advantageous in that, when the cooling medium is used in the heat exchanger, the heat exchanger is configured to transfer heat from the cleaning liquid such that the temperature of the cleaning liquid is decreased below the boiling point of the cleaning liquid at the atmospheric pressure.

The flow rate arrangement configured to control the flow rate of the cleaning liquid may comprise a flow rate pump and a flow rate detector, for example a flow rate transmitter and/or sensor known wherein the flow rate detector may be configured to control an operation of the flow rate pump.

This is advantageous in that the flow rate detector is configured to control the operation of the flow rate pump such that the flow rate of the cleaning liquid is increased or decreased when needed. By having the flow rate detector, like a transmitter, it is possible to control the operation of the flow rate pump in an efficient way. In this context, the flow rate pump is a pump configured to be operated in order to achieve a desired flow of the cleaning liquid when the cleaning liquid is circulated in the CIP unit.

The CIP unit may further comprise a control unit configured to control one or more of the one or more control valves, the flow rate arrangement, the balance tank, the heat exchanger, the further control valve and the pressure arrangement.

This is advantageous in that the CIP unit is able to be remotely controlled by using the control unit. This is further advantageous in that the CIP unit is able to be controlled in an efficient way. It should be noted that the control unit may be able to control any component comprised in the CIP unit.

The CIP unit may further comprise at least one cleaning agent inlet and at least one cleaning agent outlet which may be configured to be connected to one or more cleaning agent tanks may be connected to the main circuit section and may be configured to provide a cleaning agent to the cleaning liquid.

The CIP unit may further comprise at least one waste valve may be connected to the main circuit section and may be configured to discharge the cleaning liquid from the main circuit section.

The CIP unit may further comprise a fresh water valve may be connected to the balance tank and may be configured to feed fresh water to the balance tank.

This is advantageous in that the balance tank is configured to mix the cleaning liquid with fresh water if needed.

According to a second aspect it is provided a cleaning in place, CIP, system configured to clean a liquid food processing plant, the CIP system comprising a CIP unit according to the first aspect and the liquid food processing plant connected to the CIP unit.

According to a third aspect it is provided a method for cleaning a liquid food processing plant, the method comprising: connecting a CIP unit according to the first aspect to the liquid food processing plant thereby forming the main circuit, wherein the CIP unit comprises a pressure pump and a pressure detector, such as a transmitter and/or a sensor known, forming the pressure arrangement of the CIP unit; actuating the further control valve such that the high pressure circuit section bypasses the balance tank thereby forming the high pressure circuit; controlling the pressure pump by means of the pressure detector such that the pressure of the cleaning liquid is increased above the atmospheric pressure, while circulating the cleaning liquid in the high pressure circuit; feeding a heating medium, like steam, to the heat exchanger, wherein the heat exchanger is configured to transfer heat from the heating medium to the cleaning liquid such that the temperature of the cleaning liquid is increased above a boiling point of the cleaning liquid at the atmospheric pressure; and feeding the cleaning liquid to the liquid food processing plant thereby cleaning the liquid food processing plant.

The method may further comprise: subsequent to cleaning the liquid food processing plant, feeding a cooling medium, like water, to the heat exchanger, wherein the heat exchanger may be configured to transfer heat from the cleaning liquid such that the temperature of the cleaning liquid may be decreased below the boiling point of the cleaning liquid at the atmospheric pressure; and when the temperature of the cleaning liquid may be below the boiling point of the cleaning liquid at the atmospheric pressure, actuating the further control valve such that the high pressure circuit section may be disconnected and the cleaning liquid may be fed via the balance tank in the main circuit.

Effects and features of the second and third aspects are largely analogous to those described above in connection with the first aspect. Hence reference is made to the above to avoid undue repetition.

Still other objectives, features, aspects and advantages will appear from the following detailed description as well as from the drawings.

BRIEF DESCRIPTION OF THE DRAWINGS

Embodiments will now be described, by way of example, with reference to the accompanying schematic drawings, in which FIG. 1 schematically illustrates a cleaning in place, CIP, unit for cleaning a liquid food processing plant, wherein a cleaning liquid of the CIP unit is fed in a main circuit.

DETAILED DESCRIPTION

Figure 1:
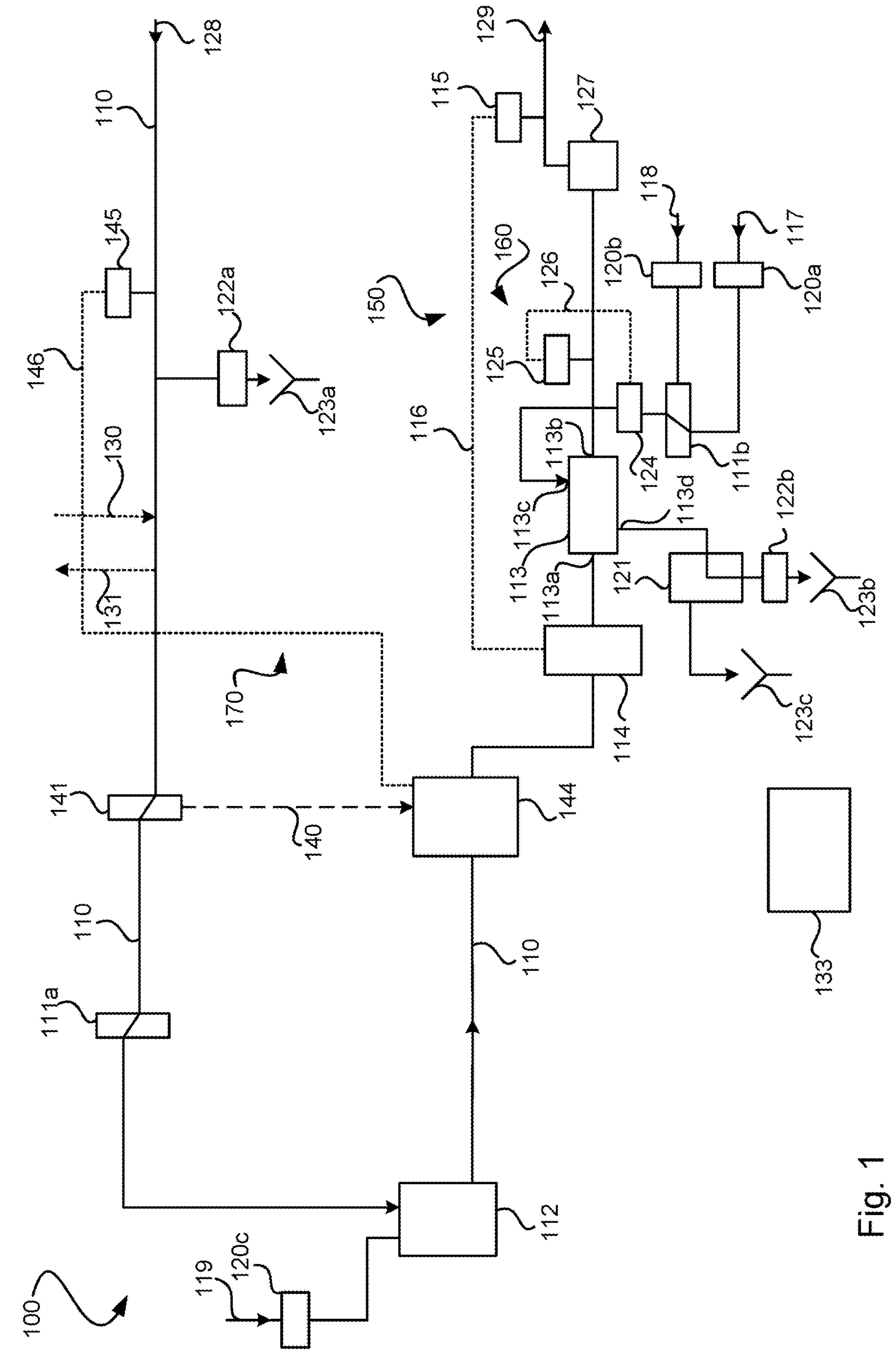

With reference to FIG. 1, a cleaning in place, CIP, unit 100 for cleaning a liquid food processing plant (not illustrated) is schematically illustrated by way of example. The CIP unit 100 and the liquid food processing plant forming a CIP system. The CIP unit 100 comprises a connecting inlet 128 and a connecting outlet 129. The connecting inlet and outlet 128, 129 are configured to be connected to the liquid food processing plant thereby the CIP unit 100 is connected to the liquid food processing plant. When the CIP unit 100 and the liquid food processing plant are connected, the cleaning liquid may be circulated between the two thereby cleaning the liquid food processing plant. When the cleaning liquid is circulated, the cleaning liquid is received by the CIP unit 100 from the liquid food processing plant via the connecting inlet 128 and the cleaning liquid is discharged from the CIP unit 100 to the liquid food processing plant via the connecting outlet 129. The cleaning liquid is circulated one or more times through the liquid food processing plant in order to obtain a satisfactory cleaning result. The cleaning liquid typically comprises water and/or one or more cleaning agents.

Before a cleaning process is started, the cleaning liquid is provided to the CIP unit 100 via one or more inlets. The cleaning liquid provided to the CIP unit 100 may be a mixture of the water and the cleaning agent. The water and the cleaning agent may be individually provided to the CIP unit 100 such that the water and the cleaning agent is mixed in the CIP unit 100. As illustrated in FIG. 1, the CIP unit 100 comprises one cleaning agent inlet 130 and one cleaning agent outlet 131. The cleaning agent inlet 130 is configured to feed water and/or cleaning agent from a cleaning agent tank (not illustrated) to the CIP unit 100. Thus, the cleaning agent tank may comprise the cleaning agent or the mixture of the cleaning agent and the water forming the cleaning liquid. The cleaning agent outlet 131 is configured to discharge cleaning liquid from the CIP unit 100. The cleaning liquid may be discharged to the cleaning agent tank. The cleaning liquid may be discharged to a drain (not illustrated). The CIP unit 100 may comprise more than one cleaning agent inlet 130 and more than one cleaning agent outlet 131 to advantage.

As further illustrated in FIG. 1, the cleaning liquid is feed in a counterclockwise direction in a main circuit section 110 of the CIP unit 100.

Starting from the connecting inlet 128, the cleaning liquid is thereafter passing a pressure detector (it is a transmitter for this detailed description) 145 and a first waste valve 122*a* before passing the cleaning agent inlet 130 and cleaning agent outlet 131. The pressure transmitter 145 is discussed in more detail further below. The first waste valve 122*a* is connected to a drain 123*a* and may be configured to direct the cleaning liquid to the drain 123*a*. The drain 123*a* may be connected to a sewer.

Thereafter, the cleaning liquid is fed via a further control valve 141 being configured to control the liquid flow of the cleaning liquid. The further control valve 141 is configured to direct the cleaning liquid either in the main circuit section 110 or in a high pressure circuit section 140. The high pressure circuit section 140 is illustrated by a dashed line and will be further discussed in connection with FIG. 2. If the cleaning liquid is directed in the main circuit section 110, the cleaning liquid is fed towards a control valve 111*a*. The control valve 111*a* is configured to control the flow of the cleaning liquid and to direct the cleaning liquid to a balance tank 112. The balance tank 112 is configured to balance a volume of the cleaning liquid at an atmospheric pressure. The CIP unit 100 further comprises a fresh water inlet 119 being configured to feed fresh water to the balance tank 112 via a fresh water valve 120*c*. The fresh water valve 120*c* is configured to control a water flow of the fresh water inlet thereby controlling the fresh water being fed to the balance tank 112. Thus, the balance tank 112 is further configured to mix fresh water with the cleaning liquid which is fed in the main circuit section 110 via the balance tank 112 such that a predetermined mixture of cleaning liquid and fresh water may be provided. The cleaning liquid is fed from the balance tank 112 towards a pressure pump 144 which will be discussed in more detail in connection with FIG. 2.

The cleaning liquid is fed from the pressure pump 144 to a flow rate pump 114. The flow rate pump 114 is configured to be controlled by a flow rate detector (it is a transmitter for this detailed description) 115. In particular, the flow rate transmitter 115 is configured to control an operation of the flow rate pump 114. The flow rate pump 114 and the flow rate transmitter 115 forming a flow rate arrangement 150 being configured to control a flow rate of the cleaning liquid. In FIG. 1, the relation or connection between the flow rate transmitter 115 and the flow rate pump 114 is illustrated by a dotted line 116.

Thereafter, the cleaning liquid is fed to a heat exchanger 113. The heat exchanger 113 is configured to transfer heat to and/or from the cleaning liquid, when the cleaning liquid is fed through the heat exchanger 113. The heat exchanger 113 comprises a cleaning liquid inlet 113*a* and a cleaning liquid outlet 113*b*, wherein the temperature of the cleaning liquid is different at the cleaning liquid inlet 113*a* and the cleaning liquid outlet 113*b*. The heat exchanger 113 further comprises a heating/cooling medium inlet 113*c* and a heating/cooling medium outlet 113*d*, wherein a temperature of the heating/cooling medium is different at the heating/cooling medium inlet 113*c* and the heating/cooling medium outlet 113*d*. The heating/cooling medium inlet 113*c* is configured to feed heating/cooling medium to the heat exchanger 113, wherein the heating/cooling medium is configured to transfer heat to and/or from the heating/cooling medium from and/or to the cleaning liquid.

The CIP unit 100 further comprises a heating medium inlet 117 configured to provide the heating medium (It is steam for this detailed description) to the CIP unit 100. The steam is fed via a control valve 111*b* and a temperature regulating valve 124 to the heating/cooling medium inlet 113*c* of the heat exchanger 113. The steam is configured to be used as heating medium in the heat exchanger 113 when the heat exchanger 113 is configured to transfer heat to the cleaning liquid. Thereby, the temperature of the cleaning liquid is increased. The control valve 111*b* is configured to control a steam flow of the steam such that a desired amount of steam is fed to the heat exchanger 113. The steam preferably has a steam temperature of 150° C. when entering the heat exchanger 113. Other temperatures such as 130-170° C., preferably 140-160° C., may be used to advantage. The cleaning liquid preferably has a cleaning temperature of 135-145° C. when entering the liquid food processing plant. Other temperatures such as 120-160° C., preferably 130-150° C., may be used to advantage.

The CIP unit 100 further comprises a cooling medium inlet (the cooling medium is water in this detailed description) 118 configured to provide water to the CIP unit 100. The water is fed via the control valve 111*b* and the temperature regulating valve 124 to the heating/cooling medium inlet 113*c* of the heat exchanger 113. The water is configured to be used as cooling medium in the heat exchanger 113 when the heat exchanger 113 is configured to transfer heat from the cleaning liquid. Thereby, the temperature of the cleaning liquid is decreased. The control valve 111*b* is configured to control a water flow of the water such that a desired amount of water is fed to the heat exchanger 113. The water preferably has a water temperature of 95° C. when entering the heat exchanger 113. Other temperatures such as 70-100° C., preferably 80-100° C., may be used to advantage.

The control valve 111*b* is configured to control that either steam or water is fed to the heat exchanger 113.

Figure 2:
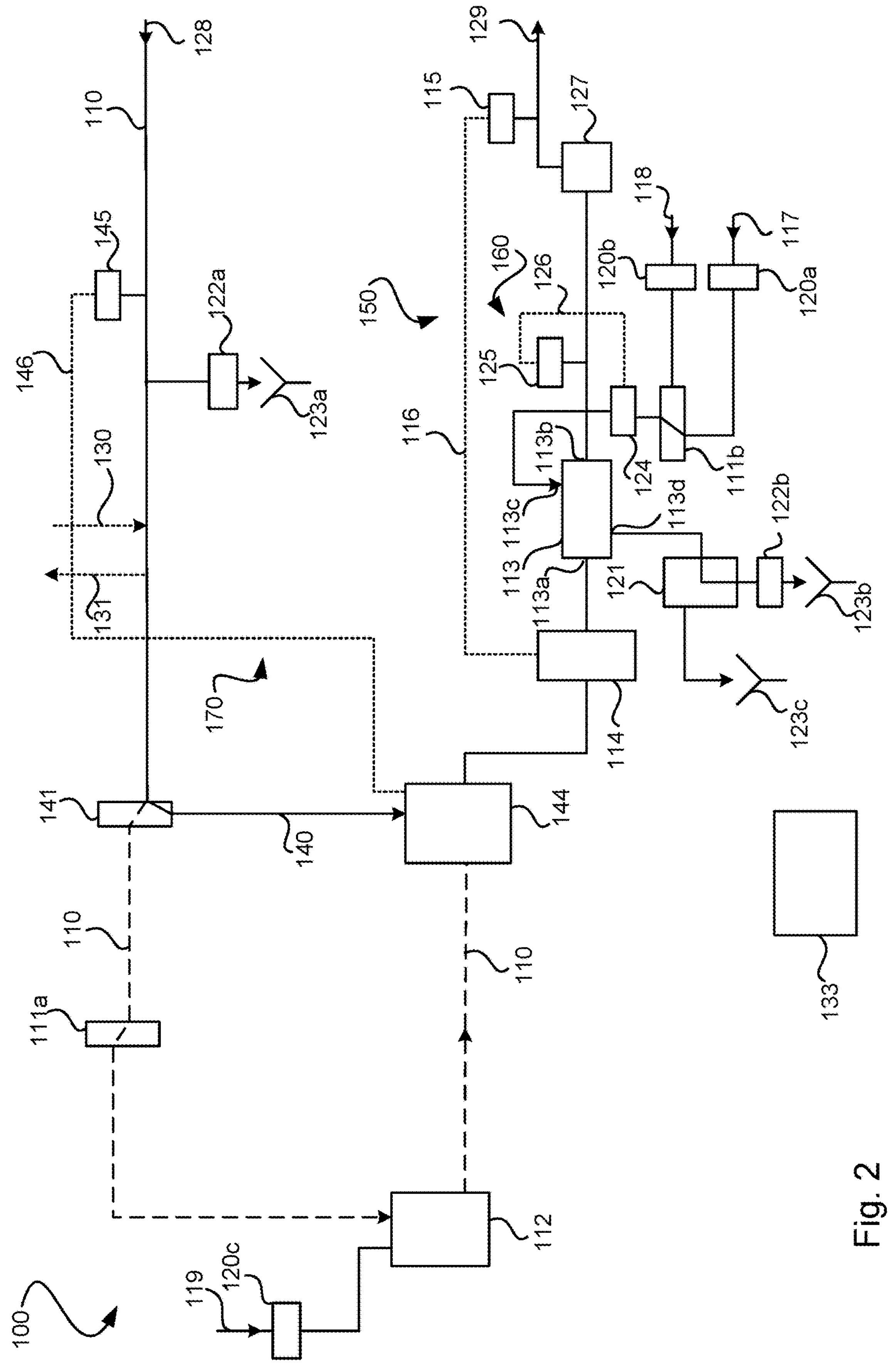
FIG. 2 schematically illustrates a cleaning in place, CIP, unit for cleaning a liquid food processing plant, wherein a cleaning liquid of the CIP unit is fed in a high pressure circuit.

The temperature regulating valve 124 is controlled by a temperature detector (it is a transmitter for this detailed description) 125. The temperature regulating valve 124 and the temperature transmitter 125 forming a temperature arrangement 160 being configured to control the temperature of the steam or water fed to the heat exchanger 113. In FIGS. 1 and 2, the relation or connection between the temperature transmitter 125 and the temperature regulating valve 124 is illustrated by a dotted line 126.

The cleaning liquid outlet is connected to a valve 127. The valve 127 is configured to direct the cleaning liquid towards the connecting outlet 129. The cleaning liquid is passing the flow rate transmitter 115 before entering the liquid food processing plant via the connecting outlet 129.

The heating/cooling medium outlet is connected to a regulating valve 121. The regulating valve 121 is configured to direct the heating/cooling medium discharged from the heat exchanger 113 to either a first drain 123*c* or a second drain 123*b*. The second drain 123*b* is controlled by a waste valve 122*b*.

The control valve 111*a*, the flow rate arrangement, the balance tank 112, and the heat exchanger 113 are connected in series thereby forming the main circuit section 110. As said above, the main circuit section 110 is configured to be connected to the liquid food processing plant thereby forming a main circuit with the liquid food processing plant.

The CIP unit 100 further comprises a control unit 133. The control unit 133 is configured to control the operation of the components comprised in the CIP unit.

With reference to FIG. 2, the further control valve 141, as introduced above, is directing the cleaning liquid in the high pressure circuit section 140 instead of in the main circuit section 110. The control valve 141 is configured to control the liquid flow of the cleaning liquid to bypass the balance tank 112. This is illustrated by the dashed line between the further control valve 141 and the pressure pump 144, via the balance tank 112. Instead, the cleaning liquid is fed directly to the pressure pump 144. In this way, the high pressure circuit section 140 is connected to the main circuit thereby forming a high pressure circuit with the main circuit while the high pressure circuit section 140 bypasses the balance tank 112. When the high pressure circuit section 141 is bypassing the balance tank 112, the CIP unit 100 forms a closed loop or circuit with the liquid food processing plant, if the liquid food processing plant is a closed equipment as discussed above. The pressure transmitter 145 is configured to control the operation of the pressure pump 144. The pressure pump 144 is controlled by means of the pressure transmitter 145 such that the pressure of the cleaning liquid is increased above the atmospheric pressure. The pressure pump 144 and the pressure transmitter 145 forming a pressure arrangement 170 being configured to control a pressure of the cleaning liquid. In FIGS. 1 and 2, the relation or connection between the pressure transmitter 145 and the pressure pump 144 is illustrated by a dotted line 146. When the pressure of the cleaning liquid is increased above the atmospheric pressure, the boiling point of the cleaning liquid is increased above the boiling point of the cleaning liquid at the atmospheric pressure. Thereby, the heat exchanger 113 is configured to transfer heat to the cleaning liquid, using the steam as the heating medium, such that the temperature of the cleaning liquid is increased above the boiling point of the cleaning liquid at the atmospheric pressure.

Before the further control valve 141 is configured to control the liquid flow of the cleaning liquid to be fed via the balance tank 112, i.e. after cleaning of the liquid food processing plant has been conducted, the heat exchanger 113 is configured to decrease the temperature of the cleaning liquid below the boiling point of the cleaning liquid at atmospheric pressure as discussed in connection with FIG. 1.

Although not illustrated, the high pressure circuit section 140 may be connected to the main circuit before the pressure pump 144.

Apart from that the further control valve 141 is directing the liquid flow in the high pressure circuit section 140, the CIP unit illustrated in FIG. 2 comprises the same features as discussed in connection with FIG. 1.

Figure 3:
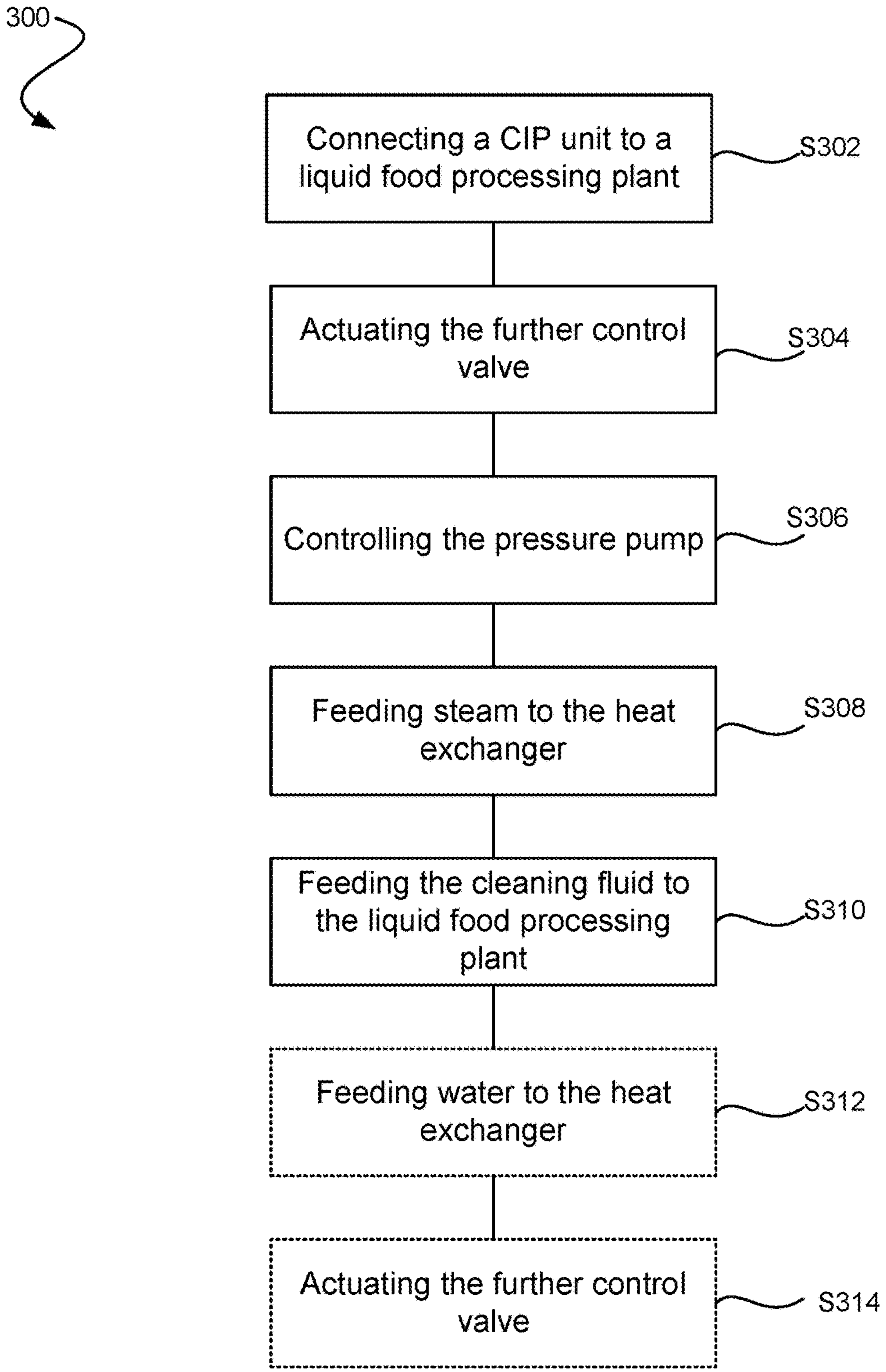
FIG. 3 is a flowchart illustrating the steps of a method for cleaning a liquid food processing plant.

With reference to FIG. 3, is a flowchart illustrating a method 300 for cleaning the liquid food processing plant. The method comprises a first step S302 in which the CIP unit 100 as discussed in connection with FIG. 1 is connected to the liquid food processing plant thereby the main circuit is formed. Thereafter, in a second step S304, the further control valve 141 being actuated such that the high pressure circuit section 140 bypasses the balance tank 112. Thereby the high pressure circuit is formed. In a third step S306, the pressure pump 144 is controlled by means of the pressure transmitter 145 such that the pressure of the cleaning liquid is increased above the atmospheric pressure, while circulating the cleaning liquid in the high pressure circuit. Thereafter, in a fourth step S308, the steam is fed to the heat exchanger 113. The heat exchanger 113 is configured to transfer heat from the steam to the cleaning liquid such that the temperature of the cleaning liquid is increased above the boiling point of the cleaning liquid at the atmospheric pressure. In a fifth step S310, the cleaning liquid is fed to the liquid food processing plant thereby cleaning the liquid food processing plant.

Optionally, in a sixth step S312, subsequent to cleaning the liquid food processing plant, the water is fed to the heat exchanger 113, wherein the heat exchanger 113 is configured to transfer heat from the cleaning liquid such that the temperature of the cleaning liquid is decreased below the boiling point of the cleaning liquid at the atmospheric pressure. In a seven step S314, when the temperature of the cleaning liquid is below the boiling point of the cleaning liquid at the atmospheric pressure, the further control valve 141 being actuated such that the high pressure circuit section 141 is disconnected and the cleaning liquid is fed via the balance tank 112 in the main circuit.

Even though illustrated and described in a certain order, other orders may also be used.

From the description above follows that, although various embodiments of the invention have been described and shown, the invention is not restricted thereto, but may also be embodied in other ways within the scope of the subject-matter defined in the following claims.

The invention claimed is:

1. A cleaning in place, CIP, unit for cleaning a liquid food processing plant by means of a cleaning liquid, the CIP unit comprising:
- a flow rate arrangement configured to control a flow rate of the cleaning liquid;
- a balance tank configured to balance a volume of the cleaning liquid at an atmospheric pressure; and
- a heat exchanger configured to transfer heat to and/or from the cleaning liquid; and
- one or more control valves;
- wherein the one or more control valves, the flow rate arrangement, the balance tank and the heat exchanger are connected in series thereby forming a main circuit section, the main circuit section being configured to be connected to the liquid food processing plant thereby forming a main circuit with the liquid food processing plant,
- wherein the CIP unit further comprises a high pressure circuit section configured to bypass the balance tank, the high pressure circuit section comprising:
  - a further control valve configured to control the liquid flow of the cleaning liquid to bypass the balance tank, and
  - a pressure arrangement configured to control a pressure of the cleaning liquid, wherein the pressure arrangement is configured to increase the pressure of the cleaning liquid above atmospheric pressure, when the cleaning liquid is bypassing the balance tank,
- wherein the high pressure circuit section is connected to the main circuit thereby forming a high pressure circuit with the main circuit while the high pressure circuit section bypasses the balance tank.

2. The CIP unit according to claim 1, wherein the pressure arrangement configured to control the pressure of the cleaning liquid comprises a pressure pump and a pressure detector, wherein the pressure detector is configured to control an operation of the pressure pump.

3. The CIP unit according to claim 1, further comprises a heating medium inlet configured to provide a heating medium of the heat exchanger, wherein the heat exchanger is configured to increase the temperature of the cleaning liquid above a boiling point of the cleaning liquid at the atmospheric pressure, when the cleaning liquid is fed in the high pressure circuit.

4. The CIP unit according to claim 3, wherein the heating medium provided to the heat exchanger has a temperature of 130-170° C., preferably 140-160° C., more preferably 150° C.

5. The CIP unit according to claim 1, wherein the cleaning liquid has a cleaning temperature of 120-160° C., preferably 130-150° C., more preferably 135-145° C., when the cleaning liquid is fed in the high pressure circuit.

6. The CIP unit according to claim 1, further comprises a cooling medium inlet configured to provide a cooling medium of the heat exchanger, wherein the heat exchanger is configured to decrease the temperature of the cleaning liquid below the boiling point of the cleaning liquid at the atmospheric pressure.

7. The CIP unit according to claim 6, wherein the cooling medium provided to the heat exchanger has a temperature of 70-100° C., preferably 80-100° C., more preferably 95° C.

8. The CIP unit according to claim 1, wherein the flow rate arrangement configured to control the flow rate of the cleaning liquid comprises a flow rate pump and a flow rate detector, wherein the flow rate detector is configured to control an operation of the flow rate pump.

9. The CIP unit according to claim 1, further comprises a control unit configured to control one or more of the one or more control valves, the flow rate arrangement, the balance tank, the heat exchanger, the further control valve and the pressure arrangement.

10. The CIP unit according to claim 1, wherein the CIP unit further comprises at least one cleaning agent inlet and at least one cleaning agent outlet being connected to the main circuit section and being configured to be connected to one or more cleaning agent tanks configured to provide a cleaning agent to the cleaning liquid.

11. The CIP unit according to claim 1, wherein the CIP unit further comprises at least one waste valve being connected to the main circuit section and being configured to discharge the cleaning liquid from the main circuit section.

12. The CIP unit according to claim 1, wherein the CIP unit further comprises a fresh water valve being connected to the balance tank and being configured to feed fresh water to the balance tank.

13. A cleaning in place, CIP, system configured to clean a liquid food processing plant, the CIP system comprising a CIP unit according to claim 1 and the liquid food processing plant connected to the CIP unit.

14. A method for cleaning a liquid food processing plant, the method comprising:

connecting a CIP unit according to claim 1 to the liquid food processing plant thereby forming the main circuit, wherein the CIP unit comprises a pressure pump and a pressure detector forming the pressure arrangement of the CIP unit;

actuating the further control valve such that the high pressure circuit section bypasses the balance tank thereby forming the high pressure circuit;

controlling the pressure pump by means of the pressure detector such that the pressure of the cleaning liquid is increased above the atmospheric pressure, while circulating the cleaning liquid in the high pressure circuit;

feeding a heating medium to the heat exchanger, wherein the heat exchanger is configured to transfer heat from the heating medium to the cleaning liquid such that the temperature of the cleaning liquid is increased above a boiling point of the cleaning liquid at the atmospheric pressure; and feeding the cleaning liquid to the liquid food processing plant thereby cleaning the liquid food processing plant.

15. The method according to claim 14 further comprises:

subsequent to cleaning the liquid food processing plant, feeding a cooling medium to the heat exchanger, wherein the heat exchanger is configured to transfer heat from the cleaning liquid such that the temperature of the cleaning liquid is decreased below the boiling point of the cleaning liquid at the atmospheric pressure; and when the temperature of the cleaning liquid is below the boiling point of the cleaning liquid at the atmospheric pressure, actuating the further control valve such that the high pressure circuit section is disconnected and the cleaning liquid is fed via the balance tank in the main circuit.

* * * * *